United States Patent
Li

(10) Patent No.: US 12,469,201 B2
(45) Date of Patent: Nov. 11, 2025

(54) ILLUMINATION RENDERING METHOD AND APPARATUS, AND ELECTRONIC DEVICE AND STORAGE MEDIUM

(71) Applicant: NETEASE (HANGZHOU) NETWORK CO., LTD., Zhejiang (CN)

(72) Inventor: Wenyao Li, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 40 days.

(21) Appl. No.: 18/256,055

(22) PCT Filed: Nov. 19, 2021

(86) PCT No.: PCT/CN2021/131872
§ 371 (c)(1),
(2) Date: Jun. 6, 2023

(87) PCT Pub. No.: WO2022/188460
PCT Pub. Date: Sep. 15, 2022

(65) Prior Publication Data
US 2024/0062449 A1 Feb. 22, 2024

(30) Foreign Application Priority Data
Mar. 9, 2021 (CN) .......................... 202110258473.1

(51) Int. Cl.
*G06T 15/00* (2011.01)
*G06T 15/04* (2011.01)
*G06T 15/06* (2011.01)

(52) U.S. Cl.
CPC ............ *G06T 15/005* (2013.01); *G06T 15/04* (2013.01); *G06T 15/06* (2013.01); *G06T 2210/21* (2013.01); *G06T 2210/56* (2013.01)

(58) Field of Classification Search
CPC ....... G06T 15/506; G06T 15/06; G06T 15/04; G06T 15/005; G06T 2210/56; G06T 2215/12; G06T 2210/21
See application file for complete search history.

(56) References Cited

U.S. PATENT DOCUMENTS 9,202,291 B1 12/2015 Child
10,818,071 B1 10/2020 Hoppe et al.
(Continued)

FOREIGN PATENT DOCUMENTS

CN 103886636 A 6/2014
CN 104392478 A 3/2015
(Continued)

OTHER PUBLICATIONS

International Search Report dated Feb. 23, 2022 of International Application No. PCT/CN2021/131872.
(Continued)

*Primary Examiner* — Xilin Guo
(74) *Attorney, Agent, or Firm* — Qinghong Xu

(57) ABSTRACT

An illumination rendering method and apparatus, and an electronic device and a storage medium are provided. The method includes: determining the current scene shading point; emitting a virtual marching ray according to the current scene shading point; determining, according to updated scene signed-distance-field information corresponding to a current frame, a marching length corresponding to the virtual marching ray; determining at least one scene intersection point by controlling the virtual marching ray to extend into a scene, wherein the virtual marching ray is controlled to extend into the scene according to the marching length; and determining color information of the scene intersection point according to incident light information and material information of the scene intersection point, (Continued)

wherein the color information is used for indirect illumination calculation.

20 Claims, 10 Drawing Sheets

(56) References Cited

U.S. PATENT DOCUMENTS

| | | | |
|---|---|---|---|
| 10,872,460 | B1 | 12/2020 | Luo et al. |
| 11,049,291 | B1* | 6/2021 | Montazeri ............ G06T 11/001 |
| 2009/0102844 | A1* | 4/2009 | Deparis .................. G06T 15/50 |
| | | | 348/251 |
| 2020/0050550 | A1* | 2/2020 | Muthler ............. G06F 16/9027 |
| 2022/0207821 | A1* | 6/2022 | Xu ........................... G06T 15/06 |
| 2023/0274493 | A1* | 8/2023 | Schumann ............ G06T 15/506 |
| | | | 345/419 |

FOREIGN PATENT DOCUMENTS

| | | |
|---|---|---|
| CN | 107452048 A | 12/2017 |
| CN | 110310356 A | 10/2019 |
| CN | 111915712 A | 11/2020 |
| CN | 112256367 A | 1/2021 |
| WO | 2019170164 A1 | 9/2019 |

OTHER PUBLICATIONS

Notice of Allowance dated Nov. 26, 2024 of Chinese Application No. 202110258473.1.

Cheng LIN, Research and Application on Ambient Occlusion Algorithm based on Convolutional Neural Network, published on Feb. 15, 2021.

* cited by examiner

ILLUMINATION RENDERING METHOD AND APPARATUS, AND ELECTRONIC DEVICE AND STORAGE MEDIUM

CROSS-REFERENCE TO RELATED APPLICATION

The present application is the 371 application of PCT Application No. PCT/CN2021/131872, filed on Nov. 19, 2021, which is based on and claims the priority to the Chinese Patent Application NO. 202110258473.1, entitled "ILLUMINATION RENDERING METHOD AND APPARATUS, AND ELECTRONIC DEVICE AND STORAGE MEDIUM", filed on Mar. 9, 2021, the entire contents of which are hereby incorporated by reference.

TECHNICAL FIELD

The present disclosure relates to the field of rendering technologies, and in particular, to an illumination rendering method and apparatus, an electronic device and a storage medium.

BACKGROUND

Some advanced rendering effects in games, for example, indirect illumination rendering such as diffuse global light, specular reflection, soft shadows, ambient light occlusion, may be achieved through raymarching technologies. In the raymarching technologies, a length of the raymarching depends on the shortest distance between the current position and a virtual model in a scene, and that is, a Signed-distance-field (SDF) value.

SUMMARY

The technical solutions adopted by embodiments of the present disclosure are as follows.

In a first aspect, the embodiments of the present disclosure provide an illumination rendering method, the method is performed by a computing device and includes:
 determining a current scene shading point;
 emitting, according to the current scene shading point, a virtual marching ray;
 determining, according to scene signed-distance-field information corresponding to a current frame, a marching length corresponding to the virtual marching ray;
 determining at least one scene intersection point by controlling the virtual marching ray to extend into a scene, wherein the virtual marching ray is controlled to extend into the scene according to the marching length; and
 determining, according to incident light information and material information of the scene intersection point, color information of the scene intersection point, wherein the color information is used for indirect illumination calculation.

In a second aspect, the embodiments of the present disclosure further provide an electronic device, including: a processor, a storage medium, and a bus, wherein executable program instructions of the processor are stored in the storage medium, when the electronic device runs, the processor and the storage medium are in communication through the bus, and the processor is configured to:
 determine a current scene shading point;
 emit, according to the current scene shading point, a virtual marching ray;
 determine, according to scene signed-distance-field information corresponding to a current frame, a marching length corresponding to the virtual marching ray;
 determine at least one scene intersection point by controlling the virtual marching ray to extend into a scene, wherein the virtual marching ray is controlled to extend into the scene according to the marching length; and
 determine, according to incident light information and material information of the scene intersection point, color information of the scene intersection point, wherein the color information is used for indirect illumination calculation.

In a third aspect, the embodiments of the present disclosure provide a non-volatile computer-readable storage medium having a computer program stored thereon, wherein the computer program, when run by a processor, cause the processor to perform the operations of
 determining a current scene shading point;
 emitting, according to the current scene shading point, a virtual marching ray;
 determining, according to scene signed-distance-field information corresponding to a current frame, a marching length corresponding to the virtual marching ray;
 determining at least one scene intersection point by controlling the virtual marching ray to extend into a scene, wherein the virtual marching ray is controlled to extend into the scene according to the marching length; and
 determining, according to incident light information and material information of the scene intersection point, color information of the scene intersection point, wherein the color information is used for indirect illumination calculation.

BRIEF DESCRIPTION OF THE DRAWINGS

In order to make the technical solutions of embodiments of the present disclosure more clearly, the drawings used in the embodiments of the present disclosure are briefly described below. It should be understood that the following drawings only show some embodiments of the present disclosure, and therefore should not be regarded as a limitation on the scope. For persons skilled in the art, other drawings may be obtained based on these drawings without any creative work.

DETAILED DESCRIPTION

Figure 1:
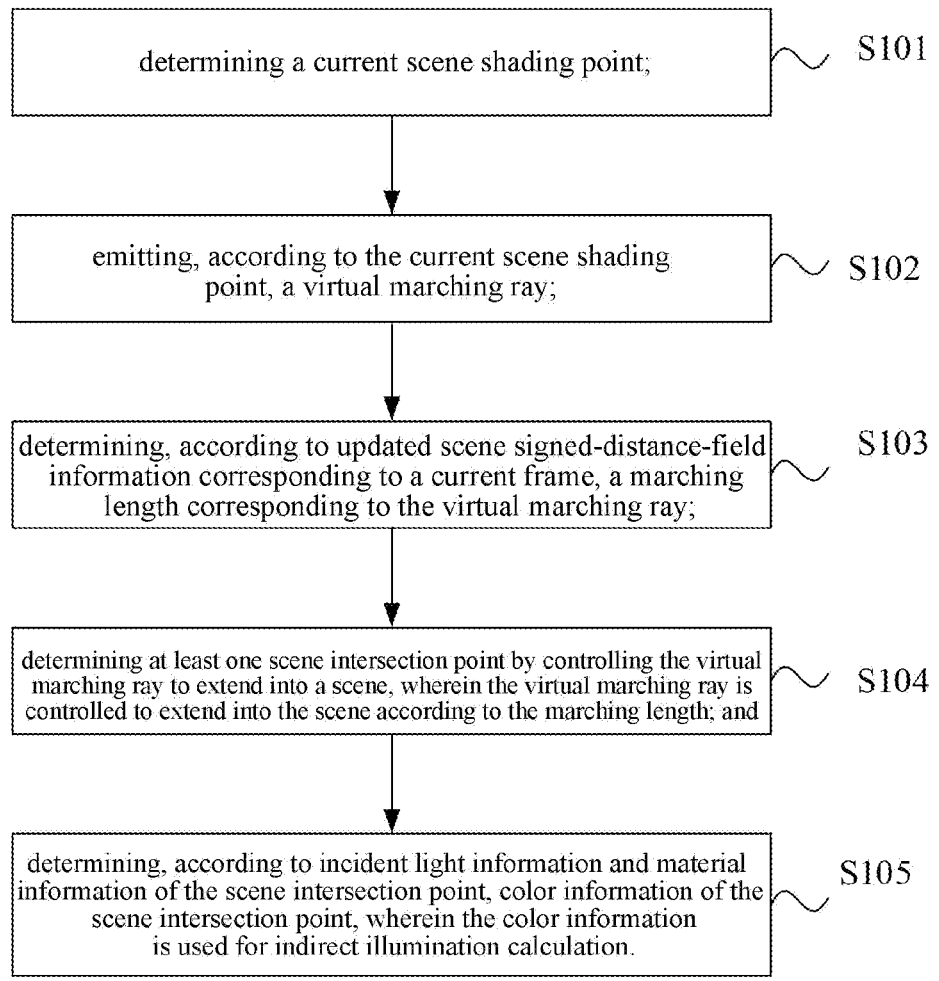
FIG. 1 is a first schematic flowchart of an illumination rendering method provided by an embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. It is to be understood that the drawings are for purposes of illustration and description only and are not intended to limit the scope of the present disclosure. In addition, it is to be understood that the illustrative drawings are not drawn to scale. The flowcharts used in the present disclosure illustrate operations implemented in accordance with some embodiments of the present disclosure. It should be understood that the operations of the flowcharts may be implemented out of order and that the steps without logical context may be performed in reverse order or concurrently. In addition, under the guidance of the content of this application, those skilled in the art may add one or more other operations to the flowcharts, or remove one or more operations from the flowcharts.

In addition, the described embodiments are only a part of, but not all of the embodiments of the present disclosure. The components of the embodiments of the present disclosure, which are generally described and illustrated in the drawings herein, may be arranged and designed in a variety of different configurations. Therefore, the following detailed description of the embodiments of the present disclosure provided in the accompanying drawings is not intended to limit the scope of the claimed application, but is merely representative of selected embodiments of the application. Based on the embodiments of the present disclosure, all other embodiments obtained by those skilled in the art without involving any inventive effort are within the scope of protection of the present disclosure.

It should be noted that in the embodiments of the present disclosure the term "comprising/comprises, including/includes" will be used to indicate the presence of the features listed thereafter, but does not exclude the addition of other features.

First, some terms that may be involved in the present disclosure are explained.

1. Signed Distance Field (SDF): given a position point in any space, the closest distance of this position point from a scene object is returned, if the position point is outside the object, a positive value is returned, and if the position point is inside the object, a negative value is returned.

2, RayMarching: a ray is emitted from a camera to each pixel of a screen, and the ray intersects a scene in a step-by-step manner. A distance advanced by each step is determined by a current ray position. If a marching length is too large, a thinner object may be skipped and an actual intersection point may be missed. After the intersection point is acquired, information such as a material and a texture of a scene surface may be acquired according to a position of the intersection point, and the illumination may be calculated in combination with light source information.

3. Scene: each virtual model of virtual models in a game scene space constitutes a scene.

4. Map pixel of a SDF texture map: it refers to a pixel grid in a texture map, and each pixel grid corresponds to a certain range of game scene space.

5. Direct illumination: illumination information generated by light of a light source directly irradiating the scene.

6. Indirect illumination: illumination information generated by one or more reflections of the light of the light source irradiating the scene.

In the related art, SDF data of each model is calculated offline and stored in a small 3D texture, and the 3D texture containing the SDF data of the model is applied to an actual position of the model in the scene through translation, rotation and scaling upon real-time rendering, so as to obtain real SDF information of the model and then update it to SDF data of the whole scene.

However, the above method cannot be applied to the rendering of dynamic models.

FIG. 1 is a first schematic flowchart of an illumination rendering method provided by an embodiment of the present disclosure, and the method may be performed by a terminal or a server. As shown in FIG. 1, the method may include S101 to S105.

In the S101, a current scene shading point is determined.

The current scene may refer to a target rendering model in a to-be-rendered game scene. Generally, the to-be-rendered game scene may include a plurality of to-be-rendered models, which may be virtual buildings, virtual characters, virtual terrains, and the like in the to-be-rendered game scene.

In an embodiment, a virtual camera may emit a virtual marching ray to the current scene, and a point on the current scene hit by the virtual marching ray is determined as the current scene shading point, and the shading point is a point where the illumination rendering needs to be performed. After the illumination rendering is performed on all shading points of the current scene, the rendering of the current scene may be completed. It should be noted that the shading point may be an area or a specific point in the scene, which is determined according to actual situations.

In the S102, a virtual marching ray is emitted according to the current scene shading point.

Some advanced rendering effects of the game for example, indirect illumination rendering such as diffuse global light, specular reflection, soft shadows, ambient light occlusion, may be achieved by indirect illumination rendering of the scene. In this implementation, the method is mainly applied to the calculation of the indirect illumination of the scene, and the calculation of the direct illumination may be performed according to the known direct illumination information.

For the calculation of the indirect illumination of the current scene, comprehensive calculation is required in combination with illumination information generated by the reflection of other scenes in the game scene to the current scene. The illumination information generated by the reflection of other scenes to the current scene may be calculated according to information, such as the material and texture of the scene surface which are acquired at intersection positions of the marching ray with other scenes.

In an embodiment, according to the current scene shading point, the virtual marching ray may be randomly emitted into the scene from the current scene shading point, so that intersection points with other scenes are finally determined through the marching of the virtual marching ray. In an implementation example, virtual marching rays are randomly emitted within a spherical range with the current scene shading point as a center, and some of the randomly emitted rays may intersect the scene, or all of them may or may not intersect the scene. When the virtual ray intersects the scene, it means that the ray emitted by the light source in the game scene is reflected to the current scene shading point through this scene.

In the S103, a marching length corresponding to the virtual marching ray is determined according to updated scene signed-distance-field information corresponding to a current frame.

In an embodiment, when the virtual marching ray is emitted forward from the current scene shading point, it may advance step by step according to the marching length, and the marching length depends on the shortest distance of a position where the virtual marching ray is currently located from the scene, that is, signed-distance-field information of the position where the virtual marching ray is currently located. Since the virtual marching ray advances step by step, each frame corresponds to advancing one step, and an advancing length of each step may be determined according to the scene signed-distance-field information of the current frame until the virtual marching ray intersects the scene. It should be noted that, in the present disclosure, the virtual marching ray intersecting the scene means that a distance between the position where the ray is currently located and the scene satisfies a preset distance or is at a surface of the scene, that is, as long as the position of the raymarching is close enough to the scene, or in a case where the spacing is acceptable, it is considered that the virtual marching ray intersects the scene.

In some embodiments, due to the change of the scene position, for example, the scene is a virtual vehicle, its position may change in real time, and in this case, the scene signed-distance-field information corresponding to the current frame also changes, the scene signed-distance-field information corresponding to the current frame may be updated in real time, and the marching length corresponding to the virtual marching ray is determined according to the updated scene signed-distance-field information corresponding to the current frame, thereby ensuring the accuracy of the acquired marching length.

In the S104, at least one scene intersection point is determined by controlling the virtual marching ray to extend into a scene, wherein the virtual marching ray is controlled to extend into the scene according to the marching length.

In an embodiment, as mentioned above, each frame may determine the marching length of the virtual marching ray of the current frame, so that the virtual marching ray may be controlled to extend forward according to the marching length determined by each frame, such that the virtual marching ray intersects at least one scene to determine the intersection point. The at least one scene is another scene except the current scene (the target scene).

In the S105, color information of the scene intersection point is determined according to incident light information and material information of the scene intersection point, and the color information is used for indirect illumination calculation.

In an embodiment, the incident light information may include: a ray color, an intensity, an angle, material, an attenuation degree, and the like. The material information of the scene intersection point may include information such as material and texture of a scene surface at a position of the scene intersection point. In an embodiment, the color information of each scene intersection point may be determined according to the incident light information and the material information of each scene intersection point.

In an implementable example, an indirect illumination rendering algorithm may be used to perform the indirect illumination rendering on the current scene according to the color information of each scene intersection point and color information of the current scene. The indirect illumination rendering algorithm may be performed with reference to the existing illumination rendering algorithm.

To sum up, the illumination rendering method provided by this embodiment includes: determining the current scene shading point; emitting the virtual marching ray according to the current scene shading point; determining the marching length corresponding to the virtual marching ray according to the updated scene signed-distance-field information corresponding to the current frame; controlling the virtual marching ray to extend into the scene according to the marching length to determine the at least one scene intersection point; and determining the color information of the scene intersection point according to the incident light information and the material information of the scene intersection point, and the color information is used for indirect illumination calculation. In this solution, the acquired scene signed-distance-field information corresponding to the current frame is information updated in real time, which may improve the accuracy of the acquired signed-distance-field information, and realize the acquisition of the accurate signed-distance-field information in a dynamic scene. Therefore, based on the acquired signed-distance-field information that is more accurate, the accurate marching of the virtual marching ray may be controlled, so that the acquired scene intersection point is more accurate, and the accurate indirect illumination is acquired, thereby improving the rendering effect of the indirect illumination in the dynamic scene.

In an embodiment, the updated scene signed-distance-field information corresponding to the current frame is information acquired by reading an updated signed-distance-field texture map corresponding to the current frame, different map pixels in the signed-distance-field texture map correspond to different spatial ranges in a game world space determined according to a position of the virtual camera, and scene signed-distance-field information of a corresponding spatial range is stored in the map pixel.

In an implementable example, the scene signed-distance-field information may be stored in the signed-distance-field texture map, that is, the SDF texture map, so that the scene signed-distance-field information may be more efficiently read from the SDF texture map during the running of the game.

Generally, the SDF texture map is composed of a plurality of map pixels, and one map pixel is also one pixel grid. Each map pixel is used to map different spatial ranges of the game world space, so that each map pixel stores the scene signed-distance-field information of the corresponding spatial range. The signed-distance-field information of any point in the spatial range may be represented by the scene signed-distance-field information of the spatial range, and that is, the signed-distance-field information of all points in a small spatial range is uniformly represented.

In an embodiment, the signed-distance-field texture map includes a plurality of layers of texture maps, each layer of texture maps uses the same pixel size to store the scene signed-distance-field information of the corresponding spatial range, and the spatial range corresponding to each layer of texture maps is determined according to a distance between the spatial range of the game world space and the virtual camera.

Figure 2:
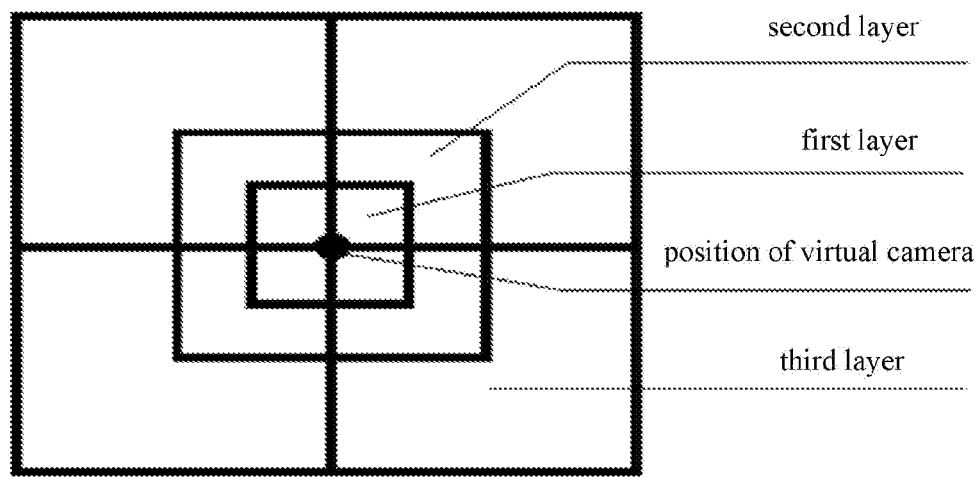
FIG. 2 is a schematic diagram of a signed-distance-field texture map provided by an embodiment of the present disclosure.

FIG. 2 is a schematic diagram of a signed-distance-field texture map provided by an embodiment of the present disclosure. In the present disclosure, the established SDF texture map may be a multi-layer texture map. In an implementable example, as shown in FIG. 2, the SDF texture map may be a three-layer 3D texture map established around the virtual camera, which maps spatial ranges of the game world space with different distances from the virtual camera, respectively.

As shown in FIG. 2, each layer is a spatial range mapped by the SDF texture map. The spatial range to which the scene signed-distance-field information stored in each layer of texture maps belongs is determined by the position of the virtual camera. When the position of the virtual camera changes, the spatial range corresponding to the texture map also changes, and the number of texture maps in each layer does not change. Each layer of texture maps uses the same pixel size to store the scene signed-distance-field information of the corresponding spatial range, and that is, the texture maps in each layer are texture maps with the same length, width and height, so that a video memory occupied by the SDF texture map is always fixed. In this embodiment, the three-layer texture map adopts the same pixel size to save scenes corresponding to different densities.

In an embodiment, different spatial ranges are mapped using SDF texture maps with the same size (same pixel dimension) to achieve different mapping precisions. The closer it is to the virtual camera, the greater the required precision, and on the contrary, the farther it is from the virtual camera, the lower the required precision, and the lower the mapping precision of the SDF texture map. In this way, it avoids the excessive video memory occupation caused by storing the SDF texture map with the uniformly whole scene (the same spatial range is mapped regardless of far and near); in addition, the coverage orientation is farther, and for the calculation result of indirect illumination, a difference with the signed-distance-field information with the fine whole scene will not be too large.

In an embodiment, during the advance of the virtual marching ray, the marching length may be determined by reading the signed-distance-field information corresponding to the target space range from the SDF texture map.

In an implementable example, in order to access signed-distance-field information of a certain position in a certain spatial range in the game world space through the SDF texture map, a coverage box range of the SDF texture map in the game world space is now defined (AABB: axis-aligned bounding box), the minimum value of bounding box coordinates is BBMin, and the maximum value of the bounding box coordinates is BBMax, then each map pixel (texture coordinate UVW) of the SDF texture map may be accurately mapped to a space range (WorldPos), and vice versa. A mapping formula may be as follows:

WorldPos=BBMin+(BBMax−BBMin)*UVW

UVW=(WorldPos−BBMin)/(BBMax−BBMin)

Figure 3:
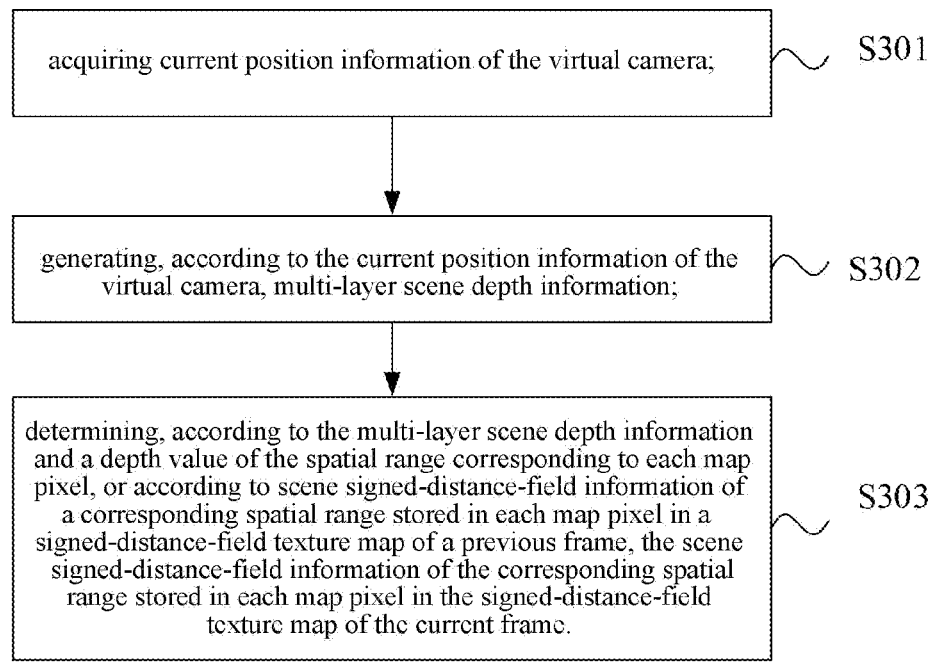
FIG. 3 is a second schematic flowchart of an illumination rendering method provided by an embodiment of the present disclosure.

FIG. 3 is a second schematic flowchart of an illumination rendering method provided by an embodiment of the present disclosure. In an embodiment, in the above steps, the scene signed-distance-field information of the corresponding spatial range stored in each map pixel in the signed-distance-field texture map is calculated in the following manner.

In S301, current position information of the virtual camera is acquired.

In an embodiment, the current position information of the virtual camera may be acquired in real time, and the combination of the virtual camera and the light source may be equivalent to eyes of an observer.

The virtual marching ray emitted by the virtual camera to the current scene may pass through a near-clip plane of the screen and hit the scene, the near-clip plane may be composed of a plurality of pixels, and a size of the near-clip plane may be the same as or different from a size of a display interval of a terminal. The picture displayed on the near-clip plane may be equivalent to the picture displayed on the mobile phone.

In S302, multi-layer scene depth information is generated according to the current position information of the virtual camera.

In an embodiment, the multi-layer scene depth information of the virtual camera at the current position may be generated according to the current position information of the virtual camera determined above. The generation method may adopt depth peeling technologies, and frontal layer depth information and back layer depth information are generated in ascending order of distances between the scenes and the virtual camera, and for the specific implementation, reference may be made to the following embodiments.

In S303, according to the multi-layer scene depth information and a depth value of the spatial range corresponding to each map pixel, or according to scene signed-distance-field information of a corresponding spatial range stored in each map pixel in a signed-distance-field texture map of a previous frame, the scene signed-distance-field information of the corresponding spatial range stored in each map pixel in the signed-distance-field texture map of the current frame is determined.

As described in the foregoing embodiments, the scene signed-distance-field information of the corresponding spatial range stored in each map pixel in the SDF texture map may change due to the movement of the scene or the movement of the virtual camera, that is, the scene signed-distance-field information of the corresponding spatial range stored in each map pixel of each frame is not fixed. If the stored scene signed-distance-field information is not updated in time, it may lead to the inaccurate reading of the scene signed-distance-field information, which makes the final acquired scene intersection point wrong.

In some cases, when the spatial range corresponding to the map pixel to be calculated is not within the current range of the field of view of the virtual camera, the scene signed-distance-field information of the corresponding spatial range stored in each map pixel in the signed-distance-field texture map of the current frame is determined according to the scene signed-distance-field information of the corresponding spatial range stored in each map pixel in the signed-distance-field texture map of the previous frame.

In other cases, when the spatial range corresponding to the map pixel to be calculated is within the current range of the field of view of the virtual camera, the scene signed-distance-field information of the corresponding spatial range stored in each map pixel in the signed-distance-field texture map of the current frame is determined according to the multi-layer scene depth information generated above and the depth value of the spatial range corresponding to each map pixel. The depth value of the spatial range corresponding to each map pixel may be determined according to a distance between the spatial range and the current position of the virtual camera.

Figure 4:
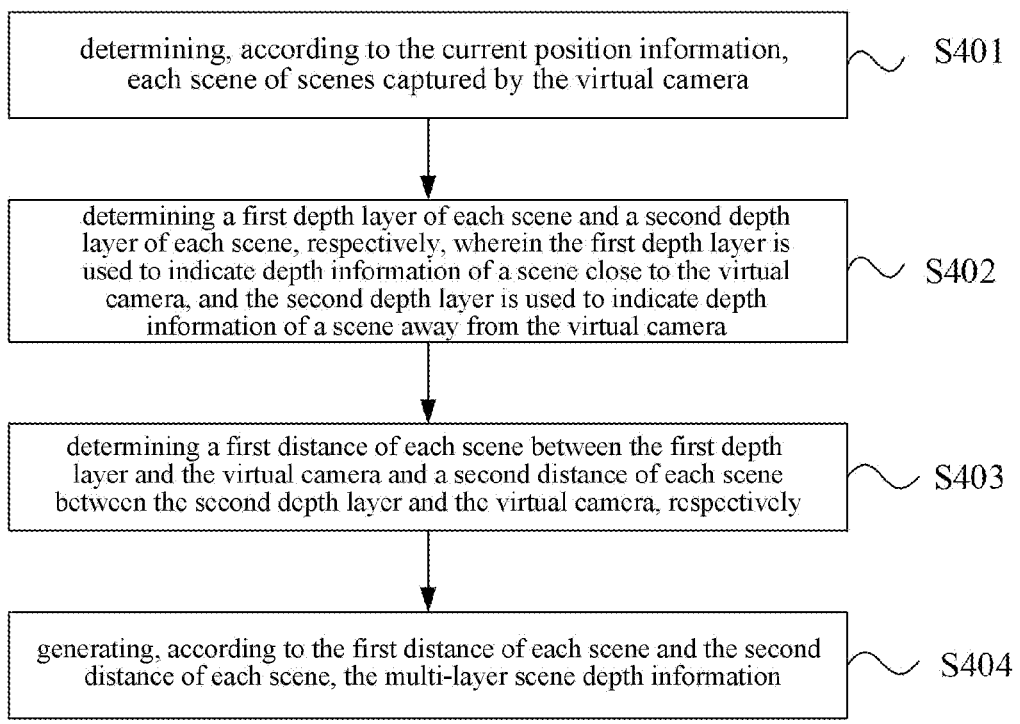
FIG. 4 is a third schematic flowchart of an illumination rendering method provided by an embodiment of the present disclosure.
Figure 5:
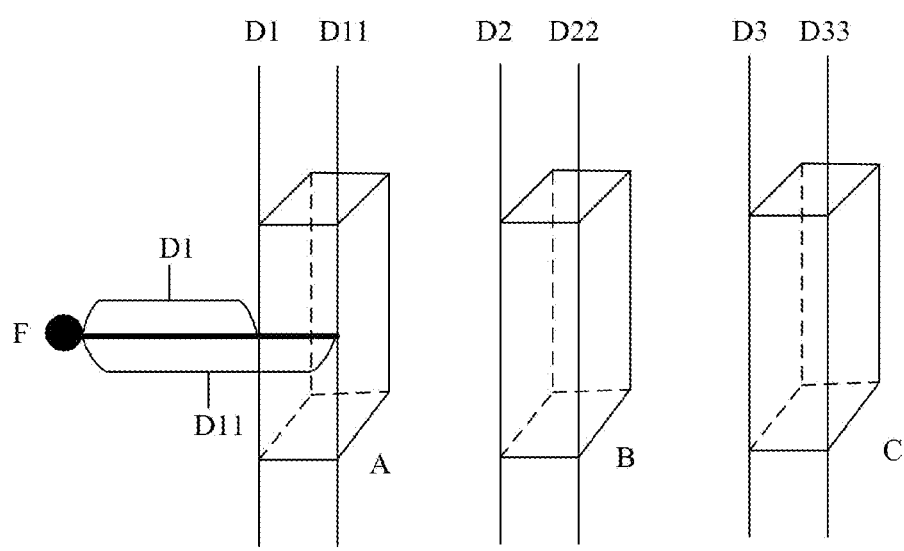
FIG. 5 is a schematic diagram of a multi-layer scene depth provided by an embodiment of the present disclosure.

FIG. 4 is a third schematic flowchart of an illumination rendering method provided by an embodiment of the present disclosure, and FIG. 5 is a schematic diagram of a multi-layer scene depth provided by an embodiment of the present disclosure. In an embodiment, in the step S302, the generating the multi-layer scene depth information according to the current position information of the virtual camera may include S401 to S404.

In the S401, each scene of scenes captured by the virtual camera is determined according to the current position information.

In an embodiment, affected by a performance of the virtual camera, a range captured by a lens of the virtual camera is limited, and not all the scenes in the game world space may be captured. For example, only scenes within 100 meters from the current position of the virtual camera may be captured. Based on the current position of the virtual camera, each scene of scenes captured by the virtual camera may be determined.

In the S402, a first depth layer of each scene and a second depth layer of each scene are determined, respectively, and the first depth layer is used to indicate depth information that the scene is close to the virtual camera, the second depth layer is used to indicate depth information that the scene is away from the virtual camera.

As shown in FIG. 5, it is assumed that the scenes captured by the virtual camera F includes scene A, scene B, and scene C, and each scene is a three-dimensional scene, it may be determined that a layer of each scene close to the virtual camera is the first depth layer, and a layer of each scene far from the virtual camera is the second depth layer. As shown, first depth layers of scene A, scene B, and scene C are D1, D2, and D3, respectively, and second depth layers are D11, D22, and D33, respectively.

In the S403, a first distance of each scene between the first depth layer and the virtual camera and a second distance of each scene between the second depth layer and the virtual camera are determined, respectively.

In an embodiment, since the current position of the virtual camera and positions of the first depth layer and the second depth layer of each scene have been determined, the first distance of each scene may be acquired according to a distance of the first depth layer of each scene from the current position of the virtual camera, and similarly, the second distance of each scene is acquired according to a distance of the second depth layer of each scene from the current position of the virtual camera.

In the S404, the multi-layer scene depth information is generated according to the first distance and the second distance of each scene.

In an embodiment, the multi-layer scene depth information may be comprehensively generated through the first distance and the second distance of each scene.

Figure 6:
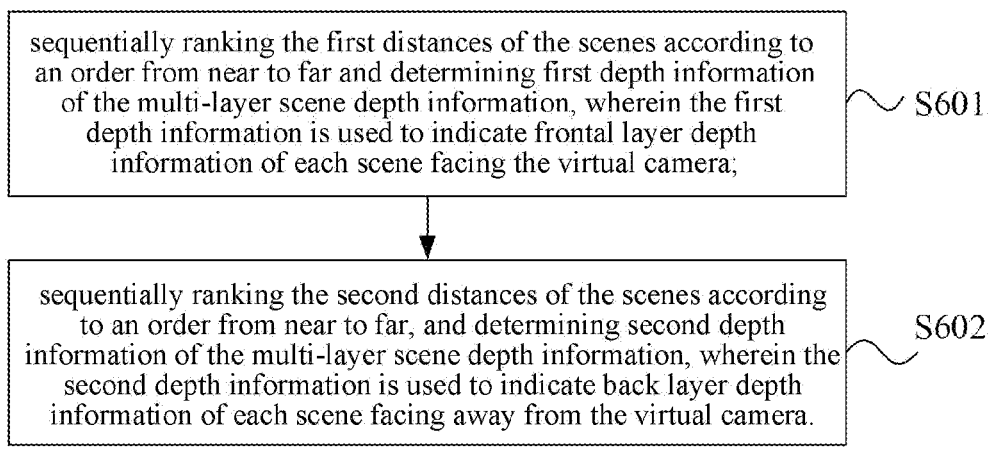
FIG. 6 is a fourth schematic flowchart of an illumination rendering method provided by an embodiment of the present disclosure.

FIG. 6 is a fourth schematic flowchart of an illumination rendering method provided by an embodiment of the present disclosure. In an embodiment, in the step S404, the generating the multi-layer scene depth information according to the first distance and the second distance of each scene may include S601 to S602.

In the S601, first distances of the scenes are ranked in sequence in an ascending order, and first depth information of the multi-layer scene depth information is determined, the first depth information is used to indicate frontal layer depth information of each scene facing the virtual camera.

In an embodiment, the multi-layer scene depth information may include the first depth information and second depth information. The first depth information may be acquired by ranking the first distances of the scenes in sequence according to an order from near to far based on distances of the scenes from the virtual camera. It may be seen from FIG. 5, scene A, scene B, and scene C are arranged from near to far from the virtual camera. It is assumed that the first distances of scene A, scene B, and scene C are D1, D2, and D3, respectively, and accordingly, the first depth information of the multi-layer scene depth information is D1, D2, and D3.

In the S602, second distances of the scenes are ranked in sequence in an ascending order, and second depth information of the multi-layer scene depth information is determined, the second depth information is used to indicate back layer depth information of each scene facing away from the virtual camera.

Similarly, it is assumed that the second distances of scene A, scene B, and scene C are D11, D22, and D33, respectively, and accordingly, the second depth information of the multi-layer scene depth information is D11, D22, and D33.

The first depth information represents the frontal layer depth information of the multi-layer scene depth information, and the second depth information represents the back layer depth information of the multi-layer scene depth information.

In this embodiment, the depthpeeling technology is used to generate the multi-layer scene depth information under the current position of the virtual camera, so that it may be accurately known whether any spatial point in the current field of view of the virtual camera is inside or outside the scene, that is, the positive or negative of the scene signed-distance-field information obtained through calculation is reliable. The calculation of the positive or negative of each piece of scene signed-distance-field information relies on the multi-layer scene depth information, so that the deviation of the signed-distance-field information caused by the parallax problem may be avoided.

Figure 7:
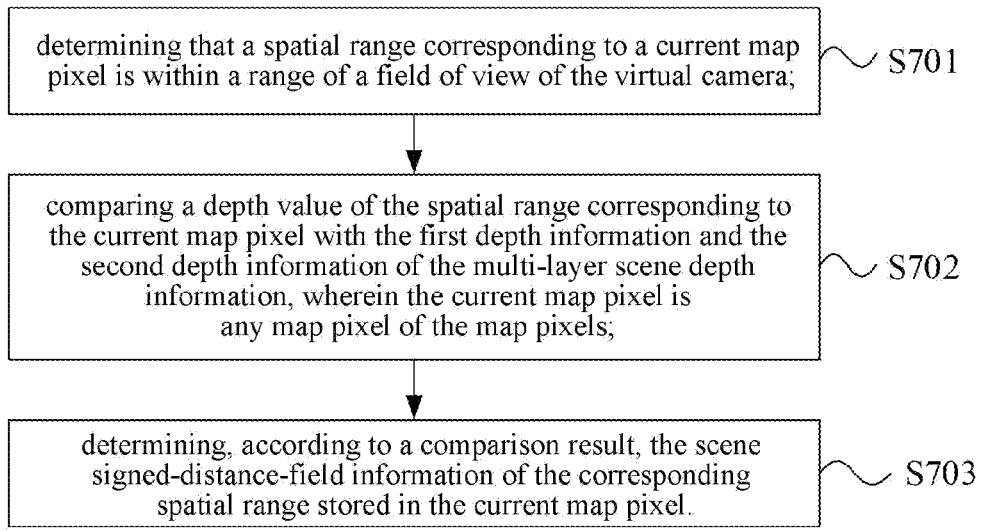
FIG. 7 is a fifth schematic flowchart of an illumination rendering method provided by an embodiment of the present disclosure.

FIG. 7 is a fifth schematic flowchart of an illumination rendering method provided by an embodiment of the present disclosure. In an embodiment, in the S303, the determining the scene signed-distance-field information of the corresponding spatial range stored in each map pixel in the signed-distance-field texture map of the current frame according to the multi-layer scene depth information and the depth value of the spatial range corresponding to each map pixel may include S701 to S703.

In the S701, it is determined that the spatial range corresponding to the current map pixel is within a range of a field of view of the virtual camera.

First, the current map pixel is mapped back to the game world space, the spatial range corresponding to the current map pixel is determined, and the depth value of the spatial range is calculated, so as to determine that the spatial range corresponding to the current map pixel is within the range of the field of view of the virtual camera according to the depth value.

In an embodiment, when the depth value of the spatial range is less than or equal to a capture distance of the virtual camera, it may be considered that the spatial range is within the range of the field of view of the virtual camera; otherwise, when the depth value of the spatial range is greater than the capture distance of the virtual camera, it may be considered that the spatial range is not within the range of the field of view of the virtual camera. The depth value of the spatial range may refer to a straight-line distance between the spatial range and the virtual camera.

In the S702, the depth value of the spatial range corresponding to the current map pixel is compared with the first depth information and the second depth information of the multi-layer scene depth information, and the current map pixel is any of the map pixels.

When it is determined that the spatial range corresponding to the current map pixel is within the range of the field of view of the virtual camera as above, the depth value of the spatial range may be compared with the first depth information and the second depth information of the multi-layer scene depth information acquired above to obtain a comparison result.

It should be noted that the above-mentioned current map pixel refers to a map pixel currently being calculated, which may be any map pixel among map pixels of the SDF texture map.

In the S703, the scene signed-distance-field information of the corresponding spatial range stored in the current map pixel is determined according to a comparison result.

In some embodiments, different comparison results may correspond to different calculation methods for the scene signed-distance-field information, respectively, and according to the comparison result, the corresponding method may be used to calculate the scene signed-distance-field information of the corresponding spatial range stored in the current map pixel.

In an embodiment, in the step S703, the determining the scene signed-distance-field information of the corresponding spatial range stored in the current map pixel according to the comparison result may include: determining the scene signed-distance-field information of the corresponding spatial range stored in the current map pixel according to the comparison result, the depth value of the spatial range corresponding to the current map pixel, and the first depth information and the second depth information.

It is assumed that the depth value of the spatial range corresponding to the current map pixel is depth, the first depth information is: D1, D2, D3 . . . Dn, and the second depth information is: D11, D22, D33 . . . Dm.

If depth<min(D1, D11), the spatial range is in front of a scene surface closest to the virtual camera, and according to a formula: min(D1, D11)−depth, that is, the depth value of the spatial range is subtracted from the minimum value among D1 and D11, the scene signed-distance-field information of the corresponding spatial range stored in the current map pixel is calculated, and the current map pixel of the current frame is marked as having been assigned with the value.

If depth>max(Dn, Dm), the spatial range is behind a scene surface farthest from the virtual camera, and the scene signed-distance-field information of the corresponding spatial range stored in the current map pixel of the previous frame may be reused, that is, the scene signed-distance-field information of the corresponding spatial range stored in the current map pixel of the previous frame is determined as the scene signed-distance-field information of the corresponding spatial range stored in the current map pixel of the current frame, and the current map pixel of the current frame is marked as not being assigned with the value.

In a case that the spatial range may be located between two scenes, and a layer closest to the spatial range may be first determined from the first depth information and the second depth information, and its depth is set as Zn.

If there is i such that Di<depth<Dii, for example: there is D1<depth<D11, or D2<depth<D22, it proves that the spatial range is inside the scene, and according to a formula: max(Di-depth, depth-Dii), taking Di as D1 and Dii as D11 as an example, that is, it is assumed that the spatial range is within the interior of scene A, a first result may be obtained by subtracting the depth value of the spatial range from the first distance of scene A, a second result may be obtained by subtracting the second distance of scene A from the depth value of the spatial range, and the maximum value is taken from the first result and the second result as the scene signed-distance-field information of the corresponding spatial range stored in the current map pixel, and the current map pixel of the current frame is marked as having been assigned with the value.

If there is no i such that Di<depth<Dii, it proves that the spatial range is outside the scene, and according to a formula: abs(depth-Zn), the scene signed-distance-field information of the corresponding spatial range stored in the current map pixel may be calculated, where abs refers to taking an absolute value.

The above describes several methods for calculating the scene signed-distance-field information of the corresponding spatial range stored in the current map pixel in cases where the spatial range corresponding to the current map pixel is within the range of the field of view of the virtual camera.

In an embodiment, in the step S703, the determining the scene signed-distance-field information of the corresponding spatial range stored in each map pixel in the signed-distance-field texture map of the current frame according to the scene signed-distance-field information of the corresponding spatial range stored in each map pixel in the signed-distance-field texture map of the previous frame may include: determining that a spatial range corresponding to a current map pixel is not within a range of the field of view of the virtual camera; and determining scene signed-distance-field information of a corresponding spatial range stored in the current map pixel in the signed-distance-field texture map of the previous frame as the scene signed-distance-field information of the corresponding spatial range stored in the current map pixel in the signed-distance-field texture map of the current frame, and the current map pixel is any map pixel of the map pixels.

In some cases, when it is determined that the spatial range corresponding to the current map pixel is not within the range of the field of view of the virtual camera, the scene signed-distance-field information of the corresponding spatial range stored in the current map pixel of the previous frame may be directly reused.

In an embodiment, in a case where the current map pixel has been assigned with a value, and signs of positive or negative are the same for the value of the current map pixel of the previous frame and the value of the current map pixel of the current frame:

if an absolute value of the value of the previous frame is less than the value of the current frame, the value of the previous frame will be assigned to the current frame; if an absolute value of the value of the current frame is less than the size of the space range, screen illumination information (diffuse reflection part of a direct illumination color result calculated by means of G-Buffer and scene light information) is also injected into the SDF texture map, and finally the calculated value of the current frame is updated to the SDF texture map. For each map pixel in the SDF texture map, the same method as above may be used to calculate the scene signed-distance-field information of the corresponding spatial range stored in each map pixel of the current frame, so as to obtain the updated SDF texture map. A size of the map pixel grid may refer to a size of a corresponding spatial range after the map pixel is mapped back to the game world space. It is assumed that the spatial range is 100× 100×100, then the size of the pixel grid is 100×100×100.

Figure 8:
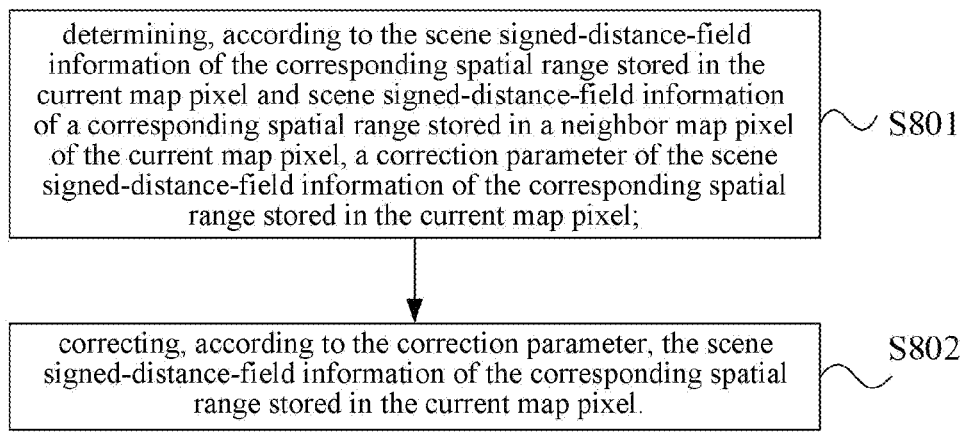
FIG. 8 is a sixth schematic flowchart of an illumination rendering method provided by an embodiment of the present disclosure.

FIG. 8 is a sixth schematic flowchart of an illumination rendering method provided by an embodiment of the present disclosure. In an embodiment, the method of the present disclosure may further include S801 and S802:

in S801, a correction parameter of the scene signed-distance-field information of the corresponding spatial range stored in the current map pixel is determined according to the scene signed-distance-field information of the corresponding spatial range stored in the current map pixel and scene signed-distance-field information of a corresponding spatial range stored in a neighbor map pixel of the current map pixel; and in S802, the scene signed-distance-field information of the corresponding spatial range stored in the current map pixel is corrected according to the correction parameter.

In an embodiment, the calculated scene signed-distance-field information of the corresponding spatial range stored in the current map pixel of the current frame may have the parallax problem, thereby affecting the value of the marching length when the virtual marching ray performs the raymarching, and causing an error of skipping an actual surface of the scene.

In this embodiment, by calculating the correction parameter of the scene signed-distance-field information of the corresponding spatial range stored in each map pixel, the calculated scene signed-distance-field information of the corresponding spatial range stored in each map pixel may be corrected, thereby improving the accuracy of the acquired scene signed-distance-field information of the corresponding spatial range stored in each map pixel.

In an embodiment, a sign of positive or negative for the scene signed-distance-field information of the corresponding spatial range stored in the current map pixel may be compared with a sign of positive or negative for the scene signed-distance-field information of the corresponding spatial range stored in the neighbor map pixel of the current map pixel, so as to determine the correction parameter corresponding to the current map pixel. The neighbor map pixel may refer to all map pixels adjacent to the current map pixel.

In an embodiment, in the step S801, the determining the correction parameter of the scene signed-distance-field information of the corresponding spatial range stored in the current map pixel according to the scene signed-distance-field information of the corresponding spatial range stored in the current map pixel and the scene signed-distance-field information of the corresponding spatial range stored in the neighbor map pixel of the current map pixel may include:

if a sign of the scene signed-distance-field information of the corresponding spatial range stored in the neighbor map pixel is opposite to a sign of the scene signed-distance-field information of the corresponding spatial range stored in the current map pixel, it is determined that the correction parameter of the scene signed-distance-field information of the corresponding spatial range stored in the current map pixel is half of an absolute value of a size of the spatial range.

In some embodiments, if the sign of the scene signed-distance-field information of the corresponding spatial range stored in the neighbor map pixel is opposite to the sign of the scene signed-distance-field information of the corresponding spatial range stored in the current map pixel, it means that this neighbor map pixel and the current map pixel are located inside and outside of a certain scene, respectively. In this case, the correction parameter may be determined as: the scene signed-distance-field information of the corresponding spatial range stored in the current map pixel multiplied by 0.5 times a length of the map pixel, where the length of the map pixel may refer to a size of a spatial range corresponding to the map pixel, such as the above 100× 100×100.

In an embodiment, in the step S801, the determining the correction parameter of the scene signed-distance-field information of the corresponding spatial range stored in the current map pixel according to the scene signed-distance-field information of the corresponding spatial range stored in the current map pixel and the scene signed-distance-field information of the corresponding spatial range stored in the neighbor map pixel of the current map pixel may include:

if signs of scene signed-distance-field information of corresponding spatial ranges stored in all neighbor map pixels are the same as a sign of the scene signed-distance-field information of the corresponding spatial range stored in the current map pixel, traversing each neighbor map pixel, calculating sums of distances from the neighbor map pixels to the current map pixel and absolute values of scene signed-distance-field information of corresponding spatial ranges stored in the neighbor map pixels, respectively, and determining a minimum sum value among the sums corresponding to the neighbor map pixels, where the distance between the neighbor map pixel to the current map pixel may be the length of the map pixel; and if the minimum sum value is smaller than an absolute value of the scene signed-distance-field information of the corresponding spatial range stored in the current map pixel, determining the correction parameter of the scene signed-distance-field information of the corresponding spatial range stored in the current map pixel is the minimum sum value.

That is, if the sum of the distance from the neighbor map pixel to the current map pixel plus the distance from the current map pixel to the scene is less than the distance from the current map pixel directly to the scene, the scene signed-distance-field information of the corresponding spatial range stored in the current map pixel is corrected as the minimum sum value. The distance from the map pixel to the scene is the scene signed-distance-field information of the corresponding spatial range stored in the map pixel. In this way, the scene signed-distance-field information of the corresponding spatial range stored in the map pixel may be made minimum to satisfy a condition of the signed-distance-field information, In an embodiment, in some embodiments, the SDF texture map of the present disclosure may also store direct illumination information corresponding to each scene. For example, the direct illumination information of the scene is directly stored in RGB channels of the SDF texture map, and a channel A stores the scene signed-distance-field information of the spatial range corresponding to each map pixel, so that when global illumination rendering is performed on the scene, the indirect illumination information and the direct illumination information may be read from the SDF texture map, respectively, to complete the calculation of the global illumination.

To sum up, the illumination rendering method provided by the embodiments of the present disclosure includes: determining the current scene shading point; emitting the virtual marching ray according to the current scene shading point; determining the marching length corresponding to the virtual marching ray according to the updated scene signed-distance-field information corresponding to the current frame; controlling the virtual marching ray to extend into the scene according to the marching length to determine the at least one scene intersection point; and determining the color information of the scene intersection point according to the incident light information and the material information of the scene intersection point, and the color information is used for indirect illumination calculation. In this solution, the acquired scene signed-distance-field information corresponding to the current frame is information updated in real time, which may improve the accuracy of the acquired signed-distance-field information, and realize the acquisition of the accurate signed-distance-field information in a dynamic scene. Therefore, based on the acquired signed-distance-field information that is more accurate, the accurate marching of the virtual marching ray may be controlled, so that the acquired scene intersection point is more accurate, and the accurate indirect illumination is acquired, thereby improving the rendering effect of the indirect illumination in the dynamic scene.

Secondly, the present disclosure uses the multi-layer SDF texture map to store the signed-distance-field information. Different spatial ranges are mapped using SDF texture maps with the same size (same pixel dimension) to achieve different mapping precisions. The closer it is to the virtual camera, the greater the required precision, and on the contrary, the farther it is from the virtual camera, the lower the required precision, and the lower the mapping precision of the SDF texture map. In this way, it avoids the excessive video memory occupation caused by storing the SDF texture map with the uniformly whole scene (the same spatial range is mapped regardless of far and near); in addition, the coverage orientation is farther, and for the calculation result of indirect illumination, a difference with the signed-distance-field information with the fine whole scene will not be too large.

In addition, the depthpeeling technology is used to generate the multi-layer scene depth information under the current position of the virtual camera, so that it may be accurately known whether any spatial point in the current field of view of the virtual camera is inside or outside the scene, that is, the positive or negative of the scene signed-distance-field information obtained through the calculation is reliable. The positive or negative of each piece of scene signed-distance-field information is calculated by relying on the multi-layer scene depth information, so that the deviation of the signed-distance-field information caused by the parallax problem may be avoided.

Finally, the direct illumination information of the scene is also stored in the SDF texture map, which may efficiently realize the calculation of the global illumination of the scene.

An apparatus, an electronic device, and a storage medium, etc. which are configured to execute the illumination rendering method provided by the present disclosure will be described below. For specific implementation processes and technical effects thereof, reference may be made to above, which will not be repeated below.

Figure 9:
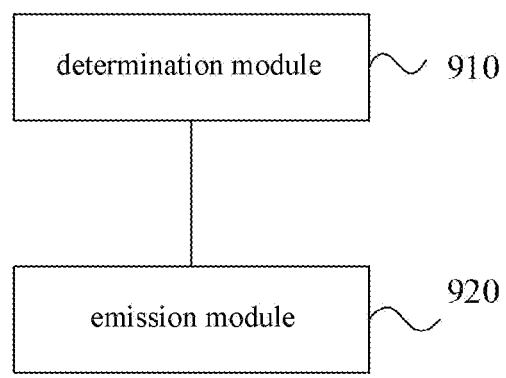
FIG. 9 is a schematic diagram of an illumination rendering apparatus provided by an embodiment of the present disclosure.

FIG. 9 is a schematic diagram of an illumination rendering apparatus provided by an embodiment of the present disclosure. Functions implemented by the illumination rendering apparatus correspond to steps performed by the above method, and the apparatus may be understood as the above-mentioned terminal or server, or a processor of the server, and may also be understood as a component independent of the above-mentioned server or processor that implements the functions of the present disclosure under the control of the server. As shown in FIG. 9, the apparatus may include:
a determination module 910 and an emission module 920;
  the determination module 910 is configured to determine a current scene shading point;
  the emission module 920 is configured to emit a virtual marching ray according to the current scene shading point;
  the determination module 910 is configured to determine a marching length corresponding to the virtual marching ray according to updated scene signed-distance-field information corresponding to a current frame;
  the determination module 910 is configured to control the virtual marching ray to extend into a scene according to the marching length to determine at least one scene intersection point; and
  the determination module 910 is configured to determine color information of the scene intersection point according to incident light information and material information of the scene intersection point, and the color information is used for indirect illumination calculation.

In an embodiment, the updated scene signed-distance-field information corresponding to the current frame is information acquired by reading an updated signed-distance-field texture map corresponding to the current frame, and different map pixels in the signed-distance-field texture map correspond to different spatial ranges in a game world space that are determined according to a position of a virtual camera, and scene signed-distance-field information of the corresponding spatial ranges is stored in the map pixels.

In an embodiment, the signed-distance-field texture map includes a plurality of layers of texture maps, each layer of texture maps uses the same pixel size to store scene signed-distance-field information of a corresponding spatial range, and the spatial range corresponding to each layer of texture maps is determined according to a distance between a spatial range of the game world space and the virtual camera.

In an embodiment, the apparatus further includes: an acquisition module and a generation module;
  the acquisition module is configured to acquire current position information of the virtual camera;
  the generation module is configured to generate multi-layer scene depth information according to the current position information of the virtual camera; and
  the determination module 910 is further configured to determine the scene signed-distance-field information of the corresponding spatial range stored in each map pixel in the signed-distance-field texture map of the current frame according to the multi-layer scene depth information and a depth value of the spatial range corresponding to each map pixel, or according to scene signed-distance-field information of a corresponding spatial range stored in each map pixel in a signed-distance-field texture map of a previous frame.

In an embodiment, the generation module is specifically configured to: determine each scene of scenes captured by the virtual camera according to the current position information; determine a first depth layer and a second depth layer of each scene, respectively, and the first depth layer is used to indicate depth information that the scene is close to the virtual camera, and the second depth layer is used to indicate depth information that the scene is away from the virtual camera; determine a first distance of each scene between the first depth and the virtual camera and a second distance of each scene between the second depth layer and the virtual camera, respectively; and generate the multi-layer scene depth information according to the first distance and the second distance of each scene.

In an embodiment, the generation module is specifically configured to: rank first distances of the scenes in sequence in an ascending order, and determine first depth information of the multi-layer scene depth information, and the first depth information is used to indicate frontal layer depth information of each scene facing the virtual camera; and rank second distances of the scenes in sequence in an ascending order, and determine second depth information of the multi-layer scene depth information, and the second depth information is used to indicate back layer depth information of each scene facing away from the virtual camera.

In an embodiment, the determination module 910 is specifically configured to: determine that a spatial range corresponding to a current map pixel is within a range of a field of view of the virtual camera; compare a depth value of the spatial range corresponding to the current map pixel with the first depth information and the second depth information of the multi-layer scene depth information, and the current map pixel is any map pixel of the map pixels; and determine scene signed-distance-field information of the corresponding spatial range stored in the current map pixel according to a comparison result.

In an embodiment, the determination module 910 is specifically configured to: determine the scene signed-distance-field information of the corresponding spatial range stored in the current map pixel according to the comparison result, the depth value of the spatial range corresponding to the current map pixel, and the first depth information and the second depth information.

In an embodiment, the determination module 910 is specifically configured to: determine that a spatial range corresponding to a current map pixel is not within a range of the field of view of the virtual camera; and determine scene signed-distance-field information of the corresponding spatial range stored in the current map pixel in the signed-distance-field texture map of the previous frame as the scene signed-distance-field information of the corresponding spatial range stored in the current map pixel in the signed-distance-field texture map of the current frame, and the current map pixel is any map pixel of the map pixels.

In an embodiment, the apparatus further includes: a correction module;
  the determination module 910 is further configured to determine a correction parameter of the scene signed-distance-field information of the corresponding spatial range stored in the current map pixel according to the scene signed-distance-field information of the corresponding spatial range stored in the current map pixel and scene signed-distance-field information of a corresponding spatial range stored in a neighbor map pixel of the current map pixel; and
  the correction module is configured to correct the scene signed-distance-field information of the corresponding spatial range stored in the current map pixel according to the correction parameter.

In an embodiment, the determination module 910 is specifically configured to determine the correction parameter of the scene signed-distance-field information of the corresponding spatial range stored in the current map pixel is half of an absolute value of a size of the spatial range, if a sign of the scene signed-distance-field information of the corresponding spatial range stored in the neighbor map pixel is opposite to a sign of the scene signed-distance-field information of the corresponding spatial range stored in the current map pixel.

In an embodiment, the determination module 910 is specifically configured to, if signs of scene signed-distance-field information of corresponding spatial ranges stored in all neighbor map pixels are the same as a sign of the scene signed-distance-field information of the corresponding spatial range stored in the current map pixel, traverse each neighbor map pixel of neighbor map pixels, calculate sums of distances from the neighbor map pixels to the current map pixel and absolute values of scene signed-distance-field information of corresponding spatial ranges stored in the neighbor map pixels, respectively, and determine a minimum sum value among the sums corresponding to the neighbor map pixels; and if the minimum sum value is smaller than an absolute value of the scene signed-distance-field information of the corresponding spatial range stored in the current map pixel, determine the correction parameter of the scene signed-distance-field information of the corresponding spatial range stored in the current map pixel is the minimum sum value.

The apparatus in above embodiments is used to implement the method provided by embodiments of the present disclosure, and specific implementations and corresponding technical effects may be understood with reference to above-mentioned embodiments, and will not be repeated here.

The above modules may be one or more integrated circuits configured to implement above methods, for example, one or more specific integrated circuits (Application Specific Integrated Circuit, ASIC), or one or more microprocessors (Digital Signal Processor, DSP), or one or more Field Programmable Gate Arrays (FPGA), etc. For another example, when some of the above modules are implemented by calling program codes by a processing element, the processing element may be a general-purpose processor, such as a central processing unit (CPU) or other processors that may call program codes. For another example, these modules may be integrated together and implemented in the form of a system-on-a-chip (SOC).

The above modules may be connected or communicated with each other via a wired connection or a wireless connection. The wired connections may include a metal cable, a cable, a mixed cable, or the like, or any combination thereof. The wireless connection may include a connection in the form of LAN, WAN, Bluetooth, ZigBee, NFC, or the like, or any combination thereof. Two or more modules may be combined into a single module, and any module may be divided into two or more units. Those skilled in the art may clearly understand that, for the convenience and brevity of description, for the specific working processes of the system and apparatus described above, reference may be made to the corresponding processes in the method embodiments, which are not repeated in the present disclosure.

It should be noted that the above modules may be one or more integrated circuits configured to implement above methods, for example, one or more specific integrated circuits (Application Specific Integrated Circuit, ASIC), or one or more microprocessors (Digital Signal Processor, DSP), or one or more Field Programmable Gate Arrays (FPGA), etc. For another example, when some of the above modules are implemented by calling program codes by a processing element, the processing element may be a general-purpose processor, such as a central processing unit (CPU) or other processors that may call program codes. For another example, these modules may be integrated together and implemented in the form of a system-on-a-chip (SOC).

Figure 10:
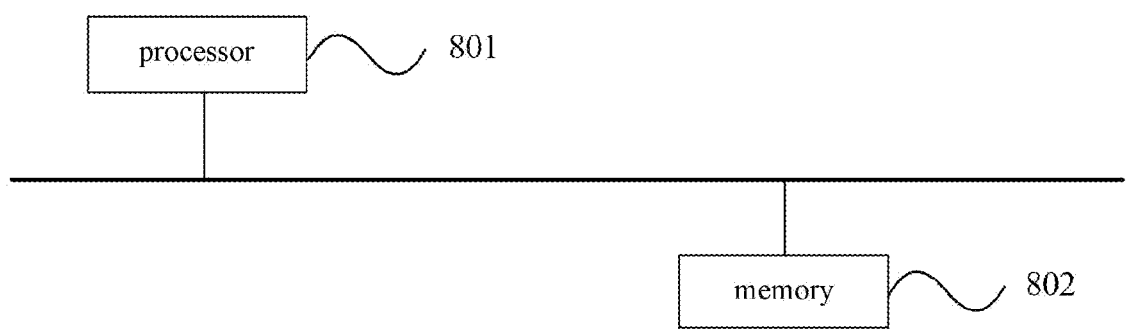
FIG. 10 is a schematic structural diagram of an electronic device provided by an embodiment of the present disclosure.

FIG. 10 is a schematic structural diagram of an electronic device provided by an embodiment of the present disclosure, and the device may be a computing device with a data processing function.

The device may include a processor 801 and a memory 802.

The memory 802 is configured to store a program, and the processor 801 calls the program stored in the memory 802 to execute the above method embodiments. Specific implementations and technical effects are similar, and details are not repeated here.

The memory 802 stores program codes, and the program codes, when executed by the processor 801, cause the processor 801 to execute various steps in the illumination rendering method according to various embodiments of the present disclosure described in the above-mentioned "Methods" section of this specification.

The processor 801 may be a general-purpose processor, such as a Central Processing Unit (CPU), a Digital Signal Processor (DSP), an Application Specific Integrated Circuit (ASIC), a Field Programmable Gate Array (FPGA) or other programmable logic devices, a discrete gate or a transistor logic device, a discrete hardware component, which may implement or execute various methods, steps, and logic block diagrams disclosed in the embodiments of the present disclosure. The general purpose processor may be a microprocessor or may also be any conventional processor, and so on. The steps of the method disclosed in conjunction with the embodiments of the present disclosure may be directly embodied as executed by a hardware processor, or executed by a combination of hardware and software modules in the processor.

As a non-volatile computer-readable storage medium, the memory 802 may be configured to store non-volatile software programs, non-volatile computer-executable programs and modules. The memory may include at least one type of storage medium, which, for example, may include a flash memory, a hard disk, a multimedia card, a card-type memory, a Random Access Memory (RAM), a Static Random Access Memory (SRAM), a Programmable Read Only Memory (PROM), a Read Only Memory (ROM), an Electrically Erasable Programmable Read-Only Memory (EEPROM), a magnetic memory, a disk, a CD and so on. The memory is, but is not limited to, any other medium that may be used to carry or store desired program codes in the form of instructions or data structures and that may be accessed by a computer. The memory 802 in the embodiments of the present disclosure may also be a circuit or any other device capable of implementing a storage function, for storing program instructions and/or data.

In an embodiment, the present disclosure further provides a program product, such as a non-volatile computer-readable storage medium, including a program, which, when executed by a processor, is configured to execute the above method embodiments.

In a first aspect, the embodiments of the present disclosure provide an illumination rendering method, including:
  determining a current scene shading point;
  emitting, according to the current scene shading point, a virtual marching ray;
  determining, according to updated scene signed-distance-field information corresponding to a current frame, a marching length corresponding to the virtual marching ray;
  determining at least one scene intersection point by controlling the virtual marching ray to extend into a scene, wherein the virtual marching ray is controlled to extend into the scene according to the marching length; and
  determining, according to incident light information and material information of the scene intersection point, color information of the scene intersection point, wherein the color information is used for indirect illumination calculation.

In an embodiment of the present disclosure, the updated scene signed-distance-field information corresponding to the current frame is information acquired by reading an updated signed-distance-field texture map corresponding to the current frame, wherein different map pixels in the signed-distance-field texture map correspond to different spatial ranges in a game world space, wherein the different spatial ranges in the game world space are determined according to a position of a virtual camera, and scene signed-distance-field information of a corresponding spatial range is stored in the map pixel.

In an embodiment of the present disclosure, the signed-distance-field texture map includes a plurality of layers of texture maps, each layer of texture maps uses the same pixel size to store the scene signed-distance-field information of the corresponding spatial range, and the spatial range corresponding to each layer of texture maps is determined according to a distance between a spatial range of the game world space and the virtual camera.

In an embodiment of the present disclosure, the scene signed-distance-field information of the corresponding spatial range stored in each map pixel of map pixels in the signed-distance-field texture map is calculated in the following manner:
  acquiring current position information of the virtual camera;
  generating, according to the current position information of the virtual camera, multi-layer scene depth information; and
  determining, according to the multi-layer scene depth information and a depth value of the spatial range corresponding to each map pixel, or according to scene signed-distance-field information of a corresponding spatial range stored in each map pixel in a signed-distance-field texture map of a previous frame, the scene signed-distance-field information of the corresponding spatial range stored in each map pixel in the signed-distance-field texture map of the current frame.

In an embodiment of the present disclosure, the generating, according to the current position information of the virtual camera, the multi-layer scene depth information includes:
  determining, according to the current position information, each scene of scenes captured by the virtual camera;
  determining a first depth layer of each scene and a second depth layer of each scene, respectively, wherein the first depth layer is used to indicate depth information of a scene close to the virtual camera, and the second depth layer is used to indicate depth information of a scene away from the virtual camera;
  determining a first distance of each scene between the first depth layer and the virtual camera and a second distance of each scene between the second depth layer and the virtual camera, respectively; and
  generating, according to the first distance of each scene and the second distance of each scene, the multi-layer scene depth information.

In an embodiment of the present disclosure, the generating, according to the first distance of each scene and the second distance of each scene, the multi-layer scene depth information includes:
  sequentially ranking the first distances of the scenes in an ascending order and determining first depth information of the multi-layer scene depth information, wherein the first depth information is used to indicate frontal layer depth information of each scene facing the virtual camera; and sequentially ranking the second distances of the scenes in an ascending order, and determining second depth information of the multi-layer scene depth information, wherein the second depth information is used to indicate back layer depth information of each scene facing away from the virtual camera.

In an embodiment of the present disclosure, the determining, according to the multi-layer scene depth information and the depth value of the spatial range corresponding to each map pixel, the scene signed-distance-field information of the corresponding spatial range stored in each map pixel in the signed-distance-field texture map of the current frame includes:

determining that a spatial range corresponding to a current map pixel is within a range of a field of view of the virtual camera;

acquiring a comparison result by comparing a depth value of the spatial range corresponding to the current map pixel with the first depth information and the second depth information of the multi-layer scene depth information, wherein the current map pixel is any map pixel of the map pixels; and determining, according to the acquiring a comparison result by, the scene signed-distance-field information of the corresponding spatial range stored in the current map pixel.

In an embodiment of the present disclosure, the determining, according to the comparison result, the scene signed-distance-field information of the corresponding spatial range stored in the current map pixel includes:

determining, according to the comparison result, the depth value of the spatial range corresponding to the current map pixel, and the first depth information and the second depth information, the scene signed-distance-field information of the corresponding spatial range stored in the current map pixel.

In an embodiment of the present disclosure, the determining, according to the scene signed-distance-field information of the corresponding spatial range stored in each map pixel in the signed-distance-field texture map of the previous frame, the scene signed-distance-field information of the corresponding spatial range stored in each map pixel in the signed-distance-field texture map of the current frame includes:

determining that a spatial range corresponding to a current map pixel is not within a range of a field of view of the virtual camera; and determining scene signed-distance-field information of the corresponding spatial range stored in the current map pixel in the signed-distance-field texture map of the previous frame as the scene signed-distance-field information of the corresponding spatial range stored in the current map pixel in the signed-distance-field texture map of the current frame, wherein the current map pixel is any map pixel of the map pixels.

In an embodiment of the present disclosure, the method further includes:

determining, according to the scene signed-distance-field information of the corresponding spatial range stored in the current map pixel and scene signed-distance-field information of a corresponding spatial range stored in a neighbor map pixel of the current map pixel, a correction parameter of the scene signed-distance-field information of the corresponding spatial range stored in the current map pixel; and correcting, according to the correction parameter, the scene signed-distance-field information of the corresponding spatial range stored in the current map pixel.

In an embodiment, the determining, according to the scene signed-distance-field information of the corresponding spatial range stored in the current map pixel and the scene signed-distance-field information of the corresponding spatial range stored in the neighbor map pixel of the current map pixel, the correction parameter of the scene signed-distance-field information of the corresponding spatial range stored in the current map pixel includes:

if a sign of the scene signed-distance-field information of the corresponding spatial range stored in the neighbor map pixel is opposite to a sign of the scene signed-distance-field information of the corresponding spatial range stored in the current map pixel, determining that the correction parameter of the scene signed-distance-field information of the corresponding spatial range stored in the current map pixel is half of an absolute value of a size of the spatial range.

In an embodiment of the present disclosure, the determining, according to the scene signed-distance-field information of the corresponding spatial range stored in the current map pixel and the scene signed-distance-field information of the corresponding spatial range stored in the neighbor map pixel of the current map pixel, the correction parameter of the scene signed-distance-field information of the corresponding spatial range stored in the current map pixel includes:

if signs of scene signed-distance-field information of corresponding spatial ranges stored in all neighbor map pixels are the same as a sign of the scene signed-distance-field information of the corresponding spatial range stored in the current map pixel, traversing each neighbor map pixel of neighbor map pixels, calculating sums of distances from the neighbor map pixels to the current map pixel and absolute values of scene signed-distance-field information of corresponding spatial ranges stored in the neighbor map pixels, respectively, and determining a minimum sum value among the sums corresponding to the neighbor map pixels; and if the minimum sum value is smaller than an absolute value of the scene signed-distance-field information of the corresponding spatial range stored in the current map pixel, determining that the correction parameter of the scene signed-distance-field information of the corresponding spatial range stored in the current map pixel is the minimum sum value.

In a second aspect, the embodiments of the present disclosure further provide an illumination rendering apparatus, including: a determination module and an emission module, wherein:

the determination module is configured to determine a current scene shading point;

the emission module is configured to emit a virtual marching ray according to the current scene shading point;

the determination module is configured to determine a marching length corresponding to the virtual marching ray according to updated scene signed-distance-field information corresponding to a current frame;

the determination module is configured to determine at least one scene intersection point by controlling the virtual marching ray to extend into a scene, wherein the virtual marching ray is controlled to extend into the scene according to the marching length; and the determination module is configured to determine color information of the scene intersection point according to incident light information and material information of the scene intersection point, wherein the color information is used for indirect illumination calculation.

In an embodiment of the present disclosure, the updated scene signed-distance-field information corresponding to the current frame is information acquired by reading an updated signed-distance-field texture map corresponding to the current frame, wherein different map pixels in the signed-distance-field texture map correspond to different spatial ranges in a game world space, wherein the different spatial ranges in the game world space are determined according to a position of a virtual camera, and scene signed-distance-field information of a corresponding spatial range is stored in the map pixel.

In an embodiment of the present disclosure, the signed-distance-field texture map comprises a plurality of layers of texture maps, each layer of texture maps uses the same pixel size to store the scene signed-distance-field information of the corresponding spatial range, and the spatial range corresponding to each layer of texture maps is determined according to a distance between a spatial range of the game world space and the virtual camera.

In an embodiment of the present disclosure, the apparatus further includes: an acquisition module and a generation module;

the acquisition module is configured to acquire current position information of the virtual camera;

the generation module is configured to generate according to the current position information of the virtual camera, multi-layer scene depth information; and the determination module is further configured to determine, according to the multi-layer scene depth information and a depth value of the spatial range corresponding to each map pixel, or according to scene signed-distance-field information of a corresponding spatial range stored in each map pixel in a signed-distance-field texture map of a previous frame, the scene signed-distance-field information of the corresponding spatial range stored in each map pixel in the signed-distance-field texture map of the current frame.

In an embodiment of the present disclosure, the generation module is specifically configured to: determine, according to the current position information, each scene of scenes captured by the virtual camera; determine a first depth layer of each scene and a second depth layer of each scene, respectively, wherein the first depth layer is used to indicate depth information of a scene close to the virtual camera, and the second depth layer is used to indicate depth information of a scene away from the virtual camera; determine a first distance of each scene between the first depth layer and the virtual camera and a second distance of each scene between the second depth layer and the virtual camera, respectively; and generate, according to the first distance of each scene and the second distance of each scene, the multi-layer scene depth information.

In an embodiment of the present disclosure, the generation module is specifically configured to: sequentially rank the first distances of the scenes in an ascending order and determine first depth information of the multi-layer scene depth information, wherein the first depth information is used to indicate frontal layer depth information of each scene facing the virtual camera; and sequentially rank the second distances of the scenes in an ascending order, and determine second depth information of the multi-layer scene depth information, wherein the second depth information is used to indicate back layer depth information of each scene facing away from the virtual camera.

In an embodiment of the present disclosure, the determination module is specifically configured to: determine that a spatial range corresponding to a current map pixel is within a range of a field of view of the virtual camera; acquire a comparisons result by comparing a depth value of the spatial range corresponding to the current map pixel with the first depth information and the second depth information of the multi-layer scene depth information, wherein the current map pixel is any map pixel of the map pixels; and determine, according to the comparison result, the scene signed-distance-field information of the corresponding spatial range stored in the current map pixel.

In an embodiment of the present disclosure, the determination module is specifically configured to: determine, according to the comparison result, the depth value of the spatial range corresponding to the current map pixel, and the first depth information and the second depth information, the scene signed-distance-field information of the corresponding spatial range stored in the current map pixel.

In an embodiment of the present disclosure, the determination module is specifically configured to: determine that a spatial range corresponding to a current map pixel is not within a range of a field of view of the virtual camera; and determine scene signed-distance-field information of the corresponding spatial range stored in the current map pixel in the signed-distance-field texture map of the previous frame as the scene signed-distance-field information of the corresponding spatial range stored in the current map pixel in the signed-distance-field texture map of the current frame, wherein the current map pixel is any map pixel of the map pixels.

In an embodiment of the present disclosure, the apparatus further includes: a correction module;

the determination module is further configured to determine, according to the scene signed-distance-field information of the corresponding spatial range stored in the current map pixel and scene signed-distance-field information of a corresponding spatial range stored in a neighbor map pixel of the current map pixel, a correction parameter of the scene signed-distance-field information of the corresponding spatial range stored in the current map pixel; and the correction module is configured to correct, according to the correction parameter, the scene signed-distance-field information of the corresponding spatial range stored in the current map pixel.

In an embodiment of the present disclosure, the determination module is specifically configured to determine that the correction parameter of the scene signed-distance-field information of the corresponding spatial range stored in the current map pixel is half of an absolute value of a size of the spatial range if a sign of the scene signed-distance-field information of the corresponding spatial range stored in the neighbor map pixel is opposite to a sign of the scene signed-distance-field information of the corresponding spatial range stored in the current map pixel.

In an embodiment of the present disclosure, the determination module is specifically configured to, if signs of scene signed-distance-field information of corresponding spatial ranges stored in all neighbor map pixels are the same as a sign of the scene signed-distance-field information of the corresponding spatial range stored in the current map pixel, traverse each neighbor map pixel of neighbor map pixels, calculate sums of distances from the neighbor map pixels to the current map pixel and absolute values of scene signed-distance-field information of corresponding spatial ranges stored in the neighbor map pixels, respectively, and determine a minimum sum value among the sums corresponding to the neighbor map pixels; and if the minimum sum value is smaller than an absolute value of the scene signed-distance-field information of the corresponding spatial range stored in the current map pixel, determine that the correction parameter of the scene signed-distance-field information of the corresponding spatial range stored in the current map pixel is the minimum sum value.

In a third aspect, the embodiments of the present disclosure provide an electronic device, including: a processor, a storage medium and a bus, wherein executable machine-readable instructions of the processor are stored in the storage medium, when the electronic device runs, the processor and the storage medium are in communication via a bus, and the processor executes the machine-readable instructions to execute steps of the method provided in the first aspect In a fourth aspect, the embodiments of the present disclosure provide a computer-readable storage medium having a computer program stored thereon, wherein the computer program, when run by a processor, executes steps of the method provided in the first aspect.

In the embodiments provided in the present disclosure, it should be understood that the apparatus and method disclosed may be implemented in other manners. For example, the apparatus embodiments described above are only illustrative. For example, division of units is only a logical function division. In a practice implementation, there may be other divisions. For example, a plurality of units or components may be combined or may be integrated into another system, or some features may be ignored, or not implemented. In addition, mutual coupling or direct coupling or communication connection shown or discussed may be indirect coupling or communication connection through some interfaces, devices or units, and may be in electrical, mechanical or other forms.

The units described as separate components may or cannot be physically separated, and components displayed as units may or cannot be physical units. That is, the components displayed as units may be located in one place, or may be distributed to a plurality of network units. Some or all of the units may be selected according to actual needs to implement solutions provided in embodiments.

In addition, functional units provided in embodiments of the present disclosure may be integrated into one processing unit, or the functional units may exist physically alone, or two or more functional units may be integrated into one unit. The above-mentioned integrated units may be implemented in the form of hardware, or may be implemented in the form of hardware and software functional units.

The above-mentioned integrated functional units implemented in the form of software may be stored in a computer-readable storage medium. The above-mentioned software functional unit is stored in a storage medium, and includes several instructions to cause a computing device (which may be a personal computer, a server, or a network device, etc.) or a processor to implement part of the method provided in various embodiments of the present disclosure. The aforementioned storage medium includes various media that may store program codes, such as U disk, mobile hard disk, read-only memory (ROM), random access memory (RAM), magnetic disk or optical disk, etc.

What is claimed is:

1. An illumination rendering method, performed by a computing device, comprising:
    determining a current scene shading point;
    emitting, according to the current scene shading point, a virtual marching ray;
    determining, according to scene signed-distance-field information corresponding to a current frame, a marching length corresponding to the virtual marching ray;
    determining at least one scene intersection point by controlling the virtual marching ray to extend into a scene, wherein the virtual marching ray is controlled to extend into the scene according to the marching length; and
    determining, according to incident light information and material information of the scene intersection point, color information of the scene intersection point, wherein the color information is used for indirect illumination calculation.

2. The method according to claim 1, wherein the scene signed-distance-field information corresponding to the current frame is information acquired by reading a signed-distance-field texture map corresponding to the current frame, wherein a map pixel in the signed-distance-field texture map corresponds to a spatial range in a game world space, wherein the spatial range in the game world space is determined according to a position of a virtual camera, and scene signed-distance-field information of a corresponding spatial range that corresponds to a map pixel is stored in the map pixel.

3. The method according to claim 2, wherein the signed-distance-field texture map comprises a plurality of layers of texture maps, each layer of texture maps uses the same pixel size to store the scene signed-distance-field information of the corresponding spatial range, and the spatial range corresponding to each layer of texture maps is determined according to a distance between the spatial range of the game world space and the virtual camera.

4. The method according to claim 3, wherein the scene signed-distance-field information of the corresponding spatial range stored in each map pixel of map pixels in the signed-distance-field texture map is calculated in the following manner:
    acquiring current position information of the virtual camera;
    generating, according to the current position information of the virtual camera, multi-layer scene depth information; and
    determining, according to the multi-layer scene depth information and a depth value of the spatial range corresponding to each map pixel, or according to scene signed-distance-field information of a corresponding spatial range stored in each map pixel in a signed-distance-field texture map of a previous frame, the scene signed-distance-field information of the corresponding spatial range stored in each map pixel in the signed-distance-field texture map of the current frame.

5. The method according to claim 4, wherein the generating, according to the current position information of the virtual camera, the multi-layer scene depth information comprises:
    determining, according to the current position information, each scene of scenes captured by the virtual camera;
    determining a first depth layer of each scene and a second depth layer of each scene, respectively, wherein the first depth layer is used to indicate depth information of a scene close to the virtual camera, and the second depth layer is used to indicate depth information of a scene away from the virtual camera;
    determining a first distance of each scene between the first depth layer and the virtual camera and a second distance of each scene between the second depth layer and the virtual camera, respectively; and generating, according to the first distance and the second distance, the multi-layer scene depth information.

6. The method according to claim 5, wherein the generating, according to the first distance and the second distance, the multi-layer scene depth information comprises:

sequentially ranking the first distances of the scenes in an ascending order and determining first depth information of the multi-layer scene depth information, wherein the first depth information is used to indicate frontal layer depth information of each scene facing the virtual camera; and sequentially ranking the second distances of the scenes in an ascending order, and determining second depth information of the multi-layer scene depth information, wherein the second depth information is used to indicate back layer depth information of each scene facing away from the virtual camera.

7. The method according to claim 6, wherein the determining, according to the multi-layer scene depth information and the depth value of the spatial range corresponding to each map pixel, the scene signed-distance-field information of the corresponding spatial range stored in each map pixel in the signed-distance-field texture map of the current frame comprises:

determining that a spatial range corresponding to a current map pixel is within a range of a field of view of the virtual camera;

acquiring a comparison result by comparing a depth value of the spatial range corresponding to the current map pixel with the first depth information and the second depth information, wherein the current map pixel is any map pixel of the map pixels; and determining, according to the comparison result, the scene signed-distance-field information of the corresponding spatial range stored in the current map pixel.

8. The method according to claim 7, wherein the determining, according to the comparison result, the scene signed-distance-field information of the corresponding spatial range stored in the current map pixel comprises:

determining, according to the comparison result, the depth value of the spatial range corresponding to the current map pixel, and the first depth information and the second depth information, the scene signed-distance-field information of the corresponding spatial range stored in the current map pixel.

9. The method according to claim 4, wherein the determining, according to the scene signed-distance-field information of the corresponding spatial range stored in each map pixel in the signed-distance-field texture map of the previous frame, the scene signed-distance-field information of the corresponding spatial range stored in each map pixel in the signed-distance-field texture map of the current frame comprises:

determining that a spatial range corresponding to a current map pixel is not within a range of a field of view of the virtual camera; and determining scene signed-distance-field information of the corresponding spatial range stored in the current map pixel in the signed-distance-field texture map of the previous frame as the scene signed-distance-field information of the corresponding spatial range stored in the current map pixel in the signed-distance-field texture map of the current frame, wherein the current map pixel is any map pixel of the map pixels.

10. The method according to claim 8, further comprising:

determining, according to the scene signed-distance-field information of the corresponding spatial range stored in the current map pixel and scene signed-distance-field information of a corresponding spatial range stored in a neighbor map pixel of the current map pixel, a correction parameter of the scene signed-distance-field information of the corresponding spatial range stored in the current map pixel; and correcting, according to the correction parameter, the scene signed-distance-field information of the corresponding spatial range stored in the current map pixel.

11. The method according to claim 10, wherein the determining, according to the scene signed-distance-field information of the corresponding spatial range stored in the current map pixel and the scene signed-distance-field information of the corresponding spatial range stored in the neighbor map pixel of the current map pixel, the correction parameter of the scene signed-distance-field information of the corresponding spatial range stored in the current map pixel comprises:

in response to that a sign of the scene signed-distance-field information of the corresponding spatial range stored in the neighbor map pixel is opposite to a sign of the scene signed-distance-field information of the corresponding spatial range stored in the current map pixel, determining that the correction parameter is half of an absolute value of a size of the spatial range.

12. The method according to claim 10, wherein the determining, according to the scene signed-distance-field information of the corresponding spatial range stored in the current map pixel and the scene signed-distance-field information of the corresponding spatial range stored in the neighbor map pixel of the current map pixel, the correction parameter of the scene signed-distance-field information of the corresponding spatial range stored in the current map pixel comprises:

in response to that signs of scene signed-distance-field information of corresponding spatial ranges stored in all neighbor map pixels are the same as a sign of the scene signed-distance-field information of the corresponding spatial range stored in the current map pixel, traversing each neighbor map pixel of neighbor map pixels, calculating sums of distances from the neighbor map pixels to the current map pixel and absolute values of scene signed-distance-field information of corresponding spatial ranges stored in the neighbor map pixels, respectively, and determining a minimum sum value among the sums corresponding to the neighbor map pixels; and in response to that the minimum sum value is smaller than an absolute value of the scene signed-distance-field information of the corresponding spatial range stored in the current map pixel, determining that the correction parameter is the minimum sum value.

13. An electronic device, comprising: a processor, a storage medium, and a bus, wherein executable program instructions of the processor are stored in the storage medium, when the electronic device runs, the processor and the storage medium are in communication through the bus, and the processor is configured to:

determine a current scene shading point;

emit, according to the current scene shading point, a virtual marching ray;

determine, according to scene signed-distance-field information corresponding to a current frame, a marching length corresponding to the virtual marching ray;

determine at least one scene intersection point by controlling the virtual marching ray to extend into a scene, wherein the virtual marching ray is controlled to extend into the scene according to the marching length; and determine, according to incident light information and material information of the scene intersection point, color information of the scene intersection point, wherein the color information is used for indirect illumination calculation.

14. The electronic device according to claim 13, wherein the scene signed-distance-field information corresponding to the current frame is information acquired by reading a signed-distance-field texture map corresponding to the current frame, wherein a map pixel in the signed-distance-field texture map corresponds to a spatial range in a game world space, wherein the spatial range in the game world space is determined according to a position of a virtual camera, and scene signed-distance-field information of a corresponding spatial range that corresponds to a map pixel is stored in the map pixel.

15. The electronic device according to claim 14, wherein the signed-distance-field texture map comprises a plurality of layers of texture maps, each layer of texture maps uses the same pixel size to store the scene signed-distance-field information of the corresponding spatial range, and the spatial range corresponding to each layer of texture maps is determined according to a distance between the spatial range of the game world space and the virtual camera.

16. The electronic device according to claim 15, wherein the scene signed-distance-field information of the corresponding spatial range stored in each map pixel of map pixels in the signed-distance-field texture map is calculated by causing the processor to be configured to:

acquire current position information of the virtual camera;

generate, according to the current position information of the virtual camera, multi-layer scene depth information; and determine, according to the multi-layer scene depth information and a depth value of the spatial range corresponding to each map pixel, or according to scene signed-distance-field information of a corresponding spatial range stored in each map pixel in a signed-distance-field texture map of a previous frame, the scene signed-distance-field information of the corresponding spatial range stored in each map pixel in the signed-distance-field texture map of the current frame.

17. The electronic device according to claim 16, wherein the processor is further configured to:

determine, according to the current position information, each scene of scenes captured by the virtual camera;

determine a first depth layer of each scene and a second depth layer of each scene, respectively, wherein the first depth layer is used to indicate depth information of a scene close to the virtual camera, and the second depth layer is used to indicate depth information of a scene away from the virtual camera;

determine a first distance of each scene between the first depth layer and the virtual camera and a second distance of each scene between the second depth layer and the virtual camera, respectively; and generate, according to the first distance and the second distance, the multi-layer scene depth information.

18. The electronic device according to claim 17, wherein the processor is further configured to:

sequentially rank the first distances of the scenes in an ascending order and determining first depth information of the multi-layer scene depth information, wherein the first depth information is used to indicate frontal layer depth information of each scene facing the virtual camera; and sequentially rank the second distances of the scenes in an ascending order, and determine second depth information of the multi-layer scene depth information, wherein the second depth information is used to indicate back layer depth information of each scene facing away from the virtual camera.

19. The electronic device according to claim 18, wherein the determining, according to the multi-layer scene depth information and the depth value of the spatial range corresponding to each map pixel, the scene signed-distance-field information of the corresponding spatial range stored in each map pixel in the signed-distance-field texture map of the current frame cause the processor to be configured to:

determine that a spatial range corresponding to a current map pixel is within a range of a field of view of the virtual camera;

acquire a comparison result by comparing a depth value of the spatial range corresponding to the current map pixel with the first depth information and the second depth information, wherein the current map pixel is any map pixel of the map pixels; and determine, according to the comparison result, the scene signed-distance-field information of the corresponding spatial range stored in the current map pixel.

20. A non-volatile computer-readable storage medium having a computer program stored thereon, wherein the computer program, when run by a processor, cause the processor to perform the operations of determining a current scene shading point;

emitting, according to the current scene shading point, a virtual marching ray;

determining, according to scene signed-distance-field information corresponding to a current frame, a marching length corresponding to the virtual marching ray;

determining at least one scene intersection point by controlling the virtual marching ray to extend into a scene, wherein the virtual marching ray is controlled to extend into the scene according to the marching length; and determining, according to incident light information and material information of the scene intersection point, color information of the scene intersection point, wherein the color information is used for indirect illumination calculation.

* * * * *